United States Patent
Allais et al.

(10) Patent No.: US 9,697,925 B2
(45) Date of Patent: Jul. 4, 2017

(54) ELECTRICAL ELEMENT COMPRISING A LAYER OF A POLYMERIC MATERIAL HAVING AN ELECTRICAL CONDUCTIVITY GRADIENT

(71) Applicant: NEXANS, Paris (FR)

(72) Inventors: Arnaud Allais, Limas (FR); Jerome Fournier, Lyons (FR); Lazhar Kebbabi, Lyons (FR); Lorrene Bayon, Lyons (FR); Anthony Combessis, Marseilles (FR); Lionel Flandin, Brens (FR)

(73) Assignee: NEXANS, Paris (FR)

( * ) Notice: Subject to any disclaimer, the term of this patent is extended or adjusted under 35 U.S.C. 154(b) by 414 days.

(21) Appl. No.: 14/345,314

(22) PCT Filed: Sep. 27, 2012

(86) PCT No.: PCT/FR2012/052185
§ 371 (c)(1),
(2) Date: Mar. 17, 2014

(87) PCT Pub. No.: WO2013/045845
PCT Pub. Date: Apr. 4, 2013

(65) Prior Publication Data
US 2014/0246220 A1    Sep. 4, 2014

(30) Foreign Application Priority Data

Sep. 28, 2011    (FR) ...................................... 11 58683

(51) Int. Cl.
*H01B 7/28*     (2006.01)
*H01B 1/24*     (2006.01)
(Continued)

(52) U.S. Cl.
CPC ................. *H01B 1/24* (2013.01); *C08K 7/24* (2013.01); *H01B 3/004* (2013.01); *H01B 3/441* (2013.01); *H01B 3/446* (2013.01); *H01B 7/2813* (2013.01); *H02G 15/068* (2013.01); *H02G 15/184* (2013.01); *B82Y 30/00* (2013.01); *B82Y 99/00* (2013.01); *C08K 2201/011* (2013.01);
(Continued)

(58) Field of Classification Search
CPC ................................ H01B 1/24; H02G 15/184
See application file for complete search history.

(56) References Cited

U.S. PATENT DOCUMENTS

| 4,400,580 A | * | 8/1983 | Yamanouchi | ............ | H01B 1/24 174/102 SC |
| 2005/0064177 A1 | * | 3/2005 | Lee | ........................ | B82Y 10/00 428/323 |

(Continued)

OTHER PUBLICATIONS

Search Report dated 2013.

*Primary Examiner* — Hoa C Nguyen
*Assistant Examiner* — Amol Patel
(74) *Attorney, Agent, or Firm* — Sofer & Haroun, LLP (57) ABSTRACT

The present invention related to an electrical element (100, 101, 102) including an electrically conductive element (3, 5, 10, 31, 32, 51), characterized in that the electrical element also includes a first layer (1) of a polymer material with electrical conductivity gradient obtained from a polymer composition including at least one polymer and conductive carbonaceous fillers.

19 Claims, 2 Drawing Sheets

(51) Int. Cl.
| | |
|---|---|
| H01B 3/44 | (2006.01) |
| H01B 3/00 | (2006.01) |
| H02G 15/068 | (2006.01) |
| C08K 7/24 | (2006.01) |
| H02G 15/184 | (2006.01) |
| B82Y 30/00 | (2011.01) |
| B82Y 99/00 | (2011.01) |
| F27D 19/00 | (2006.01) |

(52) U.S. Cl.
CPC .............. *F27D 2019/0028* (2013.01); *F27D 2019/0093* (2013.01); *Y10S 977/783* (2013.01); *Y10S 977/932* (2013.01); *Y10T 428/2918* (2015.01)

(56) References Cited

U.S. PATENT DOCUMENTS

| | | | |
|---|---|---|---|
| 2011/0017509 A1* | 1/2011 | Galletti | H01B 1/24 174/74 R |
| 2012/0001128 A1* | 1/2012 | Kim | H01B 1/24 252/511 |

* cited by examiner

ELECTRICAL ELEMENT COMPRISING A LAYER OF A POLYMERIC MATERIAL HAVING AN ELECTRICAL CONDUCTIVITY GRADIENT

RELATED APPLICATIONS

This application is a National Phase Application of PCT/FR2012/052185, filed on Sep. 27, 2012, which in turn claims the benefit of priority from French Patent Application No. 11 58683 filed on Sep. 28, 2011, the entirety of which are incorporated herein by reference.

BACKGROUND

Field of the Invention

The present invention relates to an electrical element comprising a layer of a polymeric material having an electrical conductivity gradient based on conductive carbon fillers, which layer is intended to improve resistance to breakdown and resistance to ageing in a damp environment under electrical voltage.

The present invention typically, but not exclusively, applies to the field of medium-voltage power cables (voltages especially ranging from 6 to 45-60 kV) or high-voltage power cables (voltages especially higher than 60 kV and possibly ranging as high as 500-600 kV and even up to 800 kV) whether they are DC or AC power cables.

It may be used as a polymeric layer encircling the electrical conductor of this type of cable; or even as a polymeric layer in a fitting used with this type of cable, such as, for example, a terminal or a joint.

More particularly, the layer according to the invention is intended to be positioned at the interface between a conductive material (e.g. an electrical conductor, semiconductive layer, etc.) and an electrically insulating material (e.g. an electrically insulating layer).

Description of Related Art

The discontinuity in the electrical properties between an electrically insulating material and a conductive (or semiconductive) material may lead to local concentration of the electric field via the accumulation of space charges or charged species that are liable to initiate treeing under the action of an electric field.

In particular, the presence of moisture combined with the presence of an electric field with a polymeric material promotes gradual degradation of the insulating properties of medium- and high-voltage power cables.

This degradation mechanism, well known in the art as "water treeing", may thus lead to breakdown of the electrical cable in question, and is therefore a considerable threat to the reliability of a power distribution network with well-known economic consequences due to short-circuits.

OBJECTS AND SUMMARY

The aim of the present invention is to alleviate the drawbacks of prior-art techniques by providing an electrical element, especially intended to be used in the field of medium-voltage or high-voltage power cables, having a significantly improved resistance to electrical breakdown and ageing in a damp environment in the presence of an electric field.

One subject of the present invention is an electrical element comprising an electrically conductive element, characterized in that the electrical element furthermore comprises a first layer of a polymeric material having an electrical conductivity gradient, which material is obtained from a polymeric composition comprising at least one polymer and conductive carbon fillers.

Preferably, the electrical element may furthermore comprise a second layer of an electrically insulating material, said first layer being positioned between the electrically conductive element and the second layer.

The Applicant has discovered that surprisingly the presence of a layer of a polymeric material having an electrical conductivity gradient, especially when said layer is positioned between an electrically conductive element and an electrically insulating material, allows degradation related to electrical treeing caused by space charges or charged species, in particular induced by the presence of water in this type of electrical element, to be effectively limited or even prevented.

In addition, in association with an electrically insulating material, the layer according to the invention allows the electric field concentration at the surface of said electrically insulating material to be significantly decreased: thus, the electrical element is more resistant to breakdown, under AC or DC voltages.

The expression "electrically conductive element" is understood to mean an element that may be a semiconductive material or indeed an electrically conductive material.

In the present invention, the electrical conductivity of a semiconductive material may be at least $1 \times 10^{-9}$ S/m (Siemens per meter), preferably at least $1 \times 10^{-3}$ S/m, and preferably may be lower than $1 \times 10^{3}$ S/m.

The electrical conductivity of an electrically conductive material may be at least $1 \times 10^{3}$ S/m.

The electrical conductivity of an electrically insulating material may be at most $1 \times 10^{-9}$ S/m.

In the present invention, the electrical conductivity of a material is determined conventionally according to standard ASTM D 991.

The expression "polymeric material having an electrical conductivity gradient" is understood to mean a composite polymer material the electrical conductivity of which gradually varies in the thickness of the layer formed by said polymeric material having an electrical conductivity gradient.

According to a first variant, the layer of the material having an electrical conductivity gradient may comprise a number of sublayers each having a constant conductivity, these conductivities increasing and/or decreasing so as to form said electrical conductivity gradient discretely.

According to a second variant, the layer of the material having an electrical conductivity gradient may be a single layer within which the electrical conductivity gradually varies (i.e. increases and/or decreases).

The second variant is preferable because it is more economical and easier to implement industrially.

The first layer may be defined as a layer having a thickness bounded by a first and a second surfaces, the first surface preferably being substantially parallel to the second surface.

The electrical conductivity gradient in the thickness of the first layer may range from the electrical conductivity:
- of an electrically insulating material to that of a semiconductive material;
- of an electrically insulating material to that of an electrically conductive material; or
- of a semiconductive material to that of an electrically conductive material.

These electrical conductivity characteristics especially depend on the nature of the materials making physical contact with said first layer. Each of the faces of the first layer may have an electrical conductivity that is substantially of the same type as the electrical conductivity of the material with which each of its faces makes contact, respectively.

More particularly, when the electrical element comprises the second layer, the electrical conductivity at the surface of the first layer closest the electrically conductive element will preferably be higher than the electrical conductivity at the surface of the first layer closest to the second layer.

In other words, the electrical conductivity gradient of the first layer is such that the electrical conductivity gradually decreases from the surface of the first layer closest the electrically conductive element to the surface of the first layer closest to the second layer: therefore, the first layer has a higher electrical conductivity on the electrically-conductive-element side than on the second-layer side.

By way of example, the electrical conductivity gradient of the first layer may be comprised between $1\times10^3$ S/m and $1\times10^{-18}$ S/m (limits inclusive), and preferably between $1\times10^{-1}$ S/m and $1\times10^{-11}$ S/m (limits inclusive).

The expression "polymeric material" is understood to mean a material obtained from a composition based on one or more polymers, especially allowing said material to be formed by extrusion, molding or injection molding.

The expression "conductive carbon filler" is understood to mean any particles or mixture of particles mainly consisting of carbon atoms, whether functionalized or not or grafted or not, and having electrically conductive properties.

By way of example, the conductive carbon fillers are chosen from carbon blacks, carbon fibers, graphites, graphenes, fullerenes, and carbon nanotubes, or one of their mixtures.

Carbon nanotubes will preferably be used. The term "nanotubes" is understood to mean substantially elongate nanoparticles the smallest dimension of which may be comprised between 1 and 100 nm (limits inclusive) (which dimension is determined by microscopy analysis, such as scanning electron microscopy (SEM) analysis, transmission electron microscopy (TEM) analysis, or even atomic force microscopy (AFM) analysis). Nanotubes are conventionally said to be "acicular" in shape.

Carbon nanotubes have the advantage of being more compatible with the polymer of the polymeric composition, relative to the other types of conductive carbon fillers mentioned in the present invention.

Furthermore, since carbon nanotubes have a high aspect ratio, especially an aspect ratio of at least 1000, percolation may be achieved with a relatively small number of conductive carbon fillers, in comparison with the other carbon fillers.

The aspect ratio of a conductive filler is typically the ratio between the smallest dimension of the conductive filler (i.e. diameter, for carbon nanotubes) and the largest dimension of said conductive filler (i.e. length, for carbon nanotubes).

Thus, by virtue of the use of carbon fillers of the nanotube type, the mechanical and electrical properties and the adhesion properties of the first layer are optimized.

The carbon nanotubes may be of a number of types. They may be chosen from single-walled carbon nanotubes, double-walled carbon nanotubes, and multi-walled carbon nanotubes, or one of their mixtures. Multi-walled carbon nanotubes (MWNTs) will preferably be used.

The number of conductive carbon fillers in the polymeric composition of the invention is especially large enough to form a percolating network.

The expression "percolating network" is understood to mean an arrangement of conductive fillers creating one or more continuous electrical pathways within the polymeric material of the first layer.

The polymeric composition of the first layer may comprise at most 30% by weight conductive carbon fillers, preferably at most 10% by weight conductive carbon fillers, and particularly preferably at most 5% by weight conductive carbon fillers. Preferably, it comprises at least 0.1% by weight conductive carbon fillers.

The first layer is obtained from a polymeric composition comprising at least one polymer, in which polymer said conductive carbon fillers are incorporated to form a composite polymer material.

Preferably, the polymeric composition of the first layer is based on one or more polymers, so as to be easy to form, especially by extrusion, molding or injection molding.

The polymeric composition may be a thermoplastic or elastomeric composition, optionally a cross-linkable thermoplastic or elastomeric composition.

The polymeric composition of the first layer may be a thermoplastic composition, i.e. one mainly comprising one or more thermoplastics in relation to the constituent polymers of the polymeric composition.

The polymeric composition of the first layer may be an elastomeric composition, i.e. one mainly comprising one or more elastomers in relation to the constituent polymers of the polymeric composition.

When the polymeric composition is cross-linkable, it may furthermore comprise one or more cross-linking agents.

The polymer of the polymeric composition of the invention may be chosen from organic and inorganic polymers, or one of their blends.

When the polymer of the polymeric composition of the first layer is an organic polymer, said organic polymer may comprise at least one polyolefin and/or at least one polyepoxide.

The term "polyolefin" as such is generally understood to mean an olefin homopolymer or copolymer. Preferably, the olefin polymer is an ethylene homopolymer, or an ethylene copolymer (i.e. a copolymer at least comprising ethylene).

By way of example of ethylene polymers, mention may be made of linear low-density polyethylene (LLDPE), very low-density polyethylene (VLDPE), low-density polyethylene (LDPE), medium-density polyethylene (MDPE), high-density polyethylene (HDPE), copolymers of ethylene and vinyl acetate (EVA), copolymers of ethylene and butyl acrylate (EBA), methyl acrylate (EMA), 2 ethyl hexyl acrylate (2-EHA), copolymers of ethylene and alpha-olefins such as for example poly(ethylene octene) (PEO), poly(ethylene butene) (PEB), copolymers of ethylene and propylene (EPR), such as ethylene-propylene-diene terpolymers (EPDM), polyethylene terephthalate (PET), or one of their blends and/or one of their derivatives.

EVA with a low vinyl-acetate group content (less than 20% by weight) will preferably be used in order to limit the presence of polar functionalities, or more advantageously a polyethylene such as VLDPE, LDPE, LLDPE, MDPE or HDPE will be used.

The polymeric composition of the first layer may comprise more than 50 parts by weight polyolefin per 100 parts by weight polymer(s) (i.e. polymer matrix) in the composition, preferably at least 70 parts by weight polyolefin per 100 parts by weight polymer(s) in said composition, and particularly preferably at least 90 parts by weight polyolefin per 100 parts by weight polymer(s) in said composition.

Particularly advantageously, the constituent polymer or polymers of the polymeric composition of the first layer are merely one or more polyolefins. In this case, a single type of polymer, such as an EVA having a low vinyl-acetate-group content, or a VLDPE, LDPE, LLDPE, MDPE or HDPE, will preferably be used in the composition.

The term "polyepoxide" (or "epoxy polymer") as such is generally understood to mean a multi-component polymer obtained by polymerizing epoxy monomers with a cross-linking agent, said cross-linking agent possibly being an agent such as an acid anhydride, a phenol or an amine.

By way of example of a polyepoxide, mention may be made of diglycidyl ether of bisphenol A (DGEBA).

When the polymer of the polymeric composition of the first layer is an inorganic polymer, said inorganic polymer may comprise at least one polysiloxane. In the present invention, inorganic and organic polymers are very different.

Specifically, polysiloxanes, or silicones, are inorganic compounds formed from a silicon-oxygen backbone (... —Si—O—Si—O—Si—O— ...) to which groups may attach, to the silicon atoms.

By way of example, mention may be made of poly (dimethylsiloxane).

As a first variant, the electrically conductive element of the invention may be a preferably metal and especially elongate electrical conductor.

Considering the second layer and said metal electrical conductor, the first layer is therefore positioned between the second layer and the electrical conductor. The electrical conductivity gradient of the first layer is such that the electrical conductivity gradually decreases from the surface of the first layer closest to the electrical conductor to the other surface of the first layer (i.e. the surface closest the second layer): therefore the electrical conductivity of the first layer is higher on the electrical-conductor side than on the second-layer side.

As a second variant, the electrically conductive element of the invention may be a third layer of a semiconductive material.

Considering the second and third layers, the first layer is therefore positioned between the second layer and the third layer. The electrical conductivity gradient of the first layer is such that the electrical conductivity gradually decreases from the surface of the first layer closest to the third layer to the other surface of the first layer (i.e. the surface closest the second layer): therefore the electrical conductivity of the first layer is higher on the third-layer side than on the second-layer side.

In the present invention, the semiconductive material may be a material obtained from a composition comprising at least one (electrically) conductive filler (or a semiconductive filler) in a sufficient amount to make said composition semiconductive.

The composition used to obtain a semiconductive material may comprise from 0.002 to 40% by weight (electrically) conductive fillers, preferably at least 15% by weight conductive fillers, and even more preferably at least 25% by weight conductive fillers.

The conductive filler may advantageously be chosen from all the types of conductive fillers well known in the art.

In one particular embodiment, the assembly formed by the first, second and third layers forms a three-layer insulation system. In other words, the first layer makes direct physical contact with the second layer, and the second layer makes direct physical contact with the third layer.

The electrical element according to the invention may furthermore comprise a fourth layer of a material identical to that of the first layer (i.e. of a polymeric material having an electrical conductivity gradient), and a fifth layer of a semiconductive material, said fourth layer being positioned between the second layer and the fifth layer.

In one particular embodiment, the electrical conductivity gradient of the fourth layer, when it is positioned between the second layer and the fifth layer, is such that the electrical conductivity gradually decreases from the surface of the fourth layer closest the fifth layer to the other surface of the fourth layer (i.e. the surface closest the second layer): therefore the electrical conductivity of the fourth layer is higher on the fifth-layer side than on the second-layer side.

Preferably, the second layer, the third layer, and/or the fifth layer are layers of polymeric material.

In one particular embodiment, the first, second, third, fourth and/or fifth layers are extruded layers, especially coextruded layers.

In another particular embodiment, the first, second, third, fourth and/or fifth layers may be thermoplastic or even thermoset layers cross-linked by processes well known in the art.

According to a first embodiment of the invention, the electrical element may advantageously be an electrical cable, especially a medium- or high-voltage electrical cable, in which the electrically conductive element is the electrical conductor, this electrical conductor being encircled by the first layer. This electrical conductor may be an elongate, metal electrical conductor.

When the electrical cable comprises the second layer, the latter encircles the electrical conductor. The first layer is thus positioned between the second layer and the electrical conductor.

According to a second embodiment of the invention, the electrical element may advantageously be an electrical cable, especially a medium- or high-voltage electrical cable, in which the electrically conductive element is the third layer of a semiconductive material. The electrical cable of this second embodiment then comprises the electrical conductor, this electrical conductor being surrounded by the first and third layers. This electrical conductor may be an elongate, metal electrical conductor.

When the electrical cable comprises the second layer, the first layer is positioned between the second layer and the third layer. Preferably, the second layer encircles the third layer.

In this second embodiment, the electrical cable may furthermore comprise the fourth and fifth layers.

When the electrical cable comprises the second layer, the fourth layer may then be positioned between the fifth layer and the second layer. Preferably, the fifth layer encircles the second layer.

In one particularly preferred embodiment, when the electrical cable comprises the second layer, the electrical cable comprises said electrical conductor, and the third layer, the first layer, the second layer, the fourth layer and the fifth layer are placed, in succession, around this electrical conductor.

More particularly, the assembly formed by the first, second, third, fourth and fifth layers forms a five-layer insulation system. In other words, the third layer makes direct physical contact with the electrical conductor, the first layer makes direct physical contact with the third layer, the second layer makes direct physical contact with the first layer, the fourth layer makes direct physical contact with the second layer, and the fifth layer makes direct physical contact with the fourth layer.

The electrical cable of the invention may furthermore comprise a metal screen encircling the fifth layer.

This metal screen may be what is called a "braided" screen composed of a number of copper or aluminum conductors arranged around and along the fifth layer, what is called a "foil" screen composed of one or more conductive metal foils wound in a helix around the fifth layer, or what is called a "solid" screen composed of a metal tube encircling the fifth layer. The latter type of screen in particular forms a barrier to moisture that has a tendency to penetrate the electrical cable in a radial direction.

All these types of metal screens may be used to ground the electrical cable, and may thus channel failure currents, for example in the case of a short circuit in the related network.

Furthermore, the electrical cable of the invention may also comprise an external protective cladding encircling the fifth layer or even more particularly encircling said metal screen when it exists. This external protective cladding may be produced conventionally from appropriate thermoplastics such as HDPE, MDPE or LLDPE; or even from flame-retardant or fire-resistant materials. When the latter materials contain no halogens, halogen-free flame-retardant (HFFR) materials are especially spoken of.

According to a third embodiment of the invention, the electrical element may be an electrical cable joint, especially for a medium- or high-voltage electrical cable, in which the electrically conductive element is a semiconductive material. This semiconductive material is defined in the present invention, and may refer to the third layer.

The electrical cable joint allows two electrical cables, especially two medium- or high-voltage cables, to be connected.

A joint is conventionally an elongate electrical element inside of which two electrical cables are positioned so that their electrical conductors make contact. More particularly, one of the ends of each of two cables is positioned inside the joint, so that the joint encircles said ends of the electrical cables.

Considering that these two electrical cables are medium- or high-voltage power cables comprising an elongate electrical conductor encircled conventionally by a three-layer insulation system of the type made up of what is called an internal semiconductive layer, encircled by an electrically insulating layer, the latter being encircled by what is called an external semiconductive layer, an electrical cable joint may typically comprise:
  a third layer of a semiconductive material, which layer is intended to make contact with the electrical conductors of the two electrical cables;
  a second layer of an electrically insulating polymeric material, which layer is intended to make contact with the electrically insulating layers of the two electrical cables; and
  a fifth layer of a semiconductive material, which layer is intended to make contact with the external semiconductive layers of the two electrical cables.

The joint according to the invention may comprise said first layer, positioned between the third layer and the second layer. Said joint may also comprise a fourth layer of a material identical to that of the first layer, this fourth layer being positioned between the second layer and the fifth layer.

More particularly, the various constituent layers of the joint may encircle said ends of the electrical cables.

One particular embodiment of this second variant may be a trifurcated joint, or in other words a "T" joint for connecting three electrical cables.

According to a fourth embodiment of the invention, the electrical element may be an electrical cable terminal, especially for a medium- or high-voltage electrical cable, in which the electrically conductive element is a semiconductive material. This semiconductive material is defined in the present invention, and may refer to the third layer.

A terminal, more commonly designated a "stress cone", is conventionally a cone-shaped elongate electrical element inside of which an electrical cable is positioned. More particularly, one of the ends of the electrical cable is positioned inside the terminal, so that the terminal encircles said end of the electrical cable.

Considering that said electrical cable is a medium- or high-voltage power cable comprising an elongate electrical conductor encircled conventionally by a three-layer insulation system of the type made up of what is called an internal semiconductive layer, encircled by an electrically insulating layer, the latter being encircled by what is called an external semiconductive layer, an electrical cable terminal may typically comprise:
  a third layer of a semiconductive material, which layer is intended to make contact with the external semiconductive layer of the electrical cable; and
  a second layer of an electrically insulating polymeric material, which layer is intended to make contact with the electrically insulating layer of the electrical cable.

The terminal according to the invention may comprise said first layer positioned between the third layer and the second layer.

More particularly, the various constituent layers of the terminal may encircle said end of the electrical cable.

Another subject of the invention relates to a process for manufacturing a layer of a polymeric material having an electrical conductivity gradient, for an electrical element such as described in the present invention, characterized in that it comprises a step consisting in a heat treatment of a layer of a polymeric material obtained from a polymeric composition such as defined in the invention (i.e. a polymeric layer comprising at least one polymer and conductive carbon fillers), said layer having a thickness bounded by a first and a second surface, these two surfaces preferably being substantially parallel, said treatment step being carried out by applying a first temperature T1 to the first surface and a second temperature T2 to the second surface, so as to form a temperature gradient in the thickness of said layer and to obtain a layer having an electrical conductivity gradient (cf. the first layer, and optionally the fourth layer).

More particularly, at least one of the temperatures, T1 or T2, is a temperature equal to or above the melting point $T_f$ (e.g. semi-crystalline polymers) or glass transition temperature $T_g$ (e.g. amorphous polymers) of said polymer.

Of course, it is necessary for the temperature T1 and the temperature T2 to be different if said electrical conductivity gradient is to be formed.

The difference between the temperatures T1 and T2 may be at least 10° C., preferably at least 50° C., and particularly preferably at least 100° C.

This heat treatment (i.e. heating step) of the one or more polymeric compositions according to the invention (comprising conductive carbon fillers) advantageously allows an electrical conductivity gradient to be formed in the actual thickness of the one or more layers obtained from said polymeric composition.

Specifically, by virtue of this heat treatment, relaxation of polymer chains in the molten or viscous state, associated with flocculation forces, leads to a modification of the microstructure of the polymeric composition, thus promoting the formation or improvement of the percolating network.

The dynamics of this self-organization of the conductive carbon fillers is especially dependent on temperature. In other words, high temperatures relative to the melting point $T_f$ of semicrystalline polymers or the glass transition temperature $T_g$ of amorphous polymers result in a strong dynamic that reinforces the network of fillers and leads to high conductivity values in the polymeric materials. In contrast, at temperatures near $T_f$ or $T_g$, the speed of self-organization remains low, and the electrical properties of the polymeric material are only slightly affected. In other words, the completeness of the network of conductive carbon fillers, which completeness is associated with the conductivity levels present in the material, is directly correlated to the temperature of this heat treatment, which is referred to as a "maturing treatment".

The characteristic temperatures of physiochemical transitions in a polymer or polymeric composition, whether cross-linked or not, may be determined conventionally by differential scanning calorimetry (DSC) using a temperature ramp of 10° C./min under a nitrogen atmosphere.

In one particularly advantageous embodiment, when the electrical element is an electrical cable according to the invention, the electrical conductor of the electrical cable is used as a heat source for the required time to form the electrical conductivity gradient in the thickness of the one or more layers comprising the conductive carbon fillers.

When the electrical cable merely comprises the first and second layers, and optionally the third layer, the heat treatment may be carried out once these two or three layers have been formed around the electrical conductor of the electrical cable.

A current is made to flow through the electrical conductor of the electrical cable in order to heat, to a temperature T1, by Joule heating or induction, the layer comprising the conductive carbon fillers (cf. the first layer), whereas the exterior of the electrical cable is kept at a temperature T2 below the temperature T1.

In this case, the temperature T1 is a temperature above $T_f$ (especially when the polymer is a semicrystalline polymer) or $T_g$ (especially when the polymer is an amorphous polymer). As for the temperature T2, it is a temperature below $T_f$ (especially when the polymer is a semicrystalline polymer) or $T_g$ (especially when the polymer is an amorphous polymer).

When the electrical cable comprises the assembly made up of the third, first, second, fourth and fifth layers, the heat treatment may be carried out once these five layers have been formed around the electrical conductor of the electrical cable.

A current is made to flow through the electrical conductor of the electrical cable in order to heat, to a temperature T1, by Joule heating or induction, the layer comprising the conductive carbon fillers closest to the electrical conductor (cf. the first layer), the second layer remaining at a temperature T2 below the temperature T1.

The exterior of the electrical cable is heated to a temperature T1, especially by convection, conduction or irradiation, i.e. the layer comprising the conductive carbon fillers closest to the exterior of the electrical cable (cf. the fourth layer), the second layer remaining at a temperature T2 below the temperature T1.

The temperatures T1 and T2 are defined in the same way as those mentioned above (cf. for the electrical cable merely comprising the first and second layers, and optionally the third layer).

The heat treatment step is preferably carried out after any step in which the one or more various layers that compose the electrical element are produced.

Furthermore, if the layer of a polymeric material having an electrical conductivity gradient is a cross-linked layer, the heat treatment step is preferably carried out before said layer is cross-linked.

Preferably, the one or more layers that form the electrical element may be produced by extrusion, molding or injection molding. Said layers will preferably be co-extruded.

BRIEF DESCRIPTION OF THE DRAWINGS

Other features and advantages of the present invention will become apparent in light of the following examples, which are described with reference to the annotated figures, said examples and figures being given by way of completely nonlimiting illustration.

DETAILED DESCRIPTION

For the sake of clarity, only elements that are essential to understanding the invention have been shown, schematically and not to scale.

Figure 1:
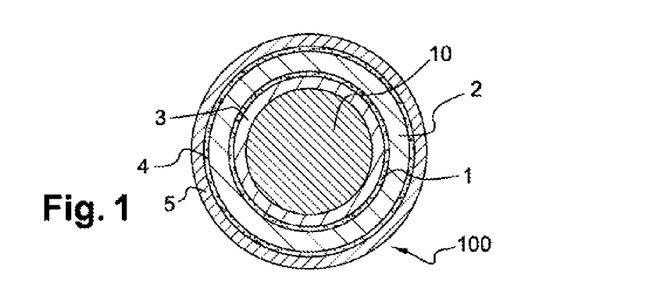
FIG. 1 shows a schematic cross-sectional view of an electrical cable according to one preferred embodiment according to the invention.

The medium- or high-voltage power cable 100 illustrated in FIG. 1 comprises an elongate central electrical conductor 10, especially made of copper or aluminum, and, in succession and coaxially about this central electrical conductor 10, there is:
- a layer 3 of a semiconductive polymeric material (i.e. the "third layer"), referred to as the internal semiconductive layer;
- a layer 1 of a polymeric material having an electrical conductivity gradient (i.e. the "first layer");
- a layer 2 of an electrically insulating polymeric material (i.e. the "second layer");
- a layer 4 of a polymeric material having an electrical conductivity gradient (i.e. the "fourth layer"); and
- a layer 5 of a semiconductive polymeric material (i.e. the "fifth layer"), referred to as the external semiconductive layer.

The layers 1, 2, 3, 4 and 5 are optionally cross-linked, extruded layers.

The electrical conductivity gradient in the thickness of the layer 1 is such that the surface of the layer 1 making contact with the layer 3 has a higher electrical conductivity than that of the surface of the layer 1 making contact with the layer 2.

A cylindrical-tube type metal screen (not shown) and an external protective cladding (not shown) may also be positioned around the fifth layer.

Figure 2:
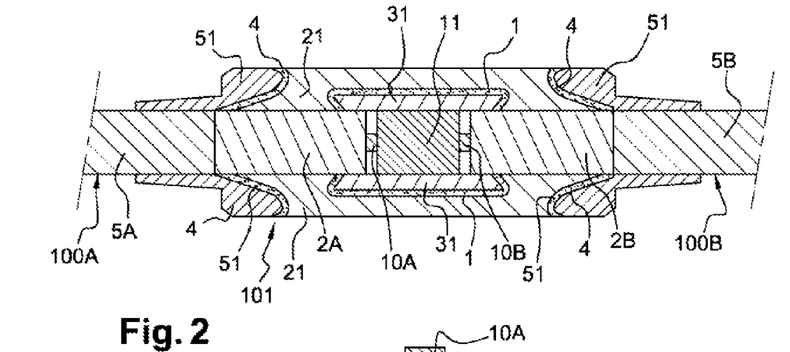
FIG. 2 shows a schematic longitudinal-section view of an electrical cable joint according to the invention.

The medium- or high-voltage electrical cable joint 101 illustrated in FIG. 2 is a tubular-type elongate element that is designed to receive, in its center, two electrical cables 100A and 100B in order to connect them. This connection may be achieved by means of an electrically conductive part 11 making direct contact with the electrical conductors 10A and 10B of each of the two electrical cables 100A and 100B.

Considering that these two electrical cables 100A and 100B are medium- or high-voltage power cables each of the central electrical conductors 10A and 10B of which is encircled by a three-layer insulation system of the type made up of what is called an internal semiconductive layer (layer not shown) encircled by an electrically insulating layer 2A, 2B, the latter being encircled by what is called an external semiconductive layer 5A, 5B, the joint according to the invention comprises:
- a layer 31 of a semiconductive material (i.e. the "third layer") making electrical contact with the electrical conductors 10A and 10B of the two electrical cables 100A and 100B, by way of the electrically conductive part 11;
- a layer 1 of a polymeric material having an electrical conductivity gradient (i.e. the "first layer"), covering the layer 3;
- a layer 21 of an electrically insulating polymeric material (i.e. the "second layer"), covering the layer 1 and making contact with the electrically insulating layers 2A and 2B of the two electrical cables;
- a layer 4 of a polymeric material having an electrical conductivity gradient (i.e. the "fourth layer"), covering the layer 21; and
- a layer 51 of a semiconductive material (i.e. the "fifth layer"), covering the fourth layer 4 and making contact with the external semiconductive layers 5A and 5B of the two electrical cables.

Thus, the first layer 1 is positioned between the third layer 31 and the second layer 21; and the fourth layer 4 is positioned between the second layer 21 and the fifth layer 51.

Figure 3:
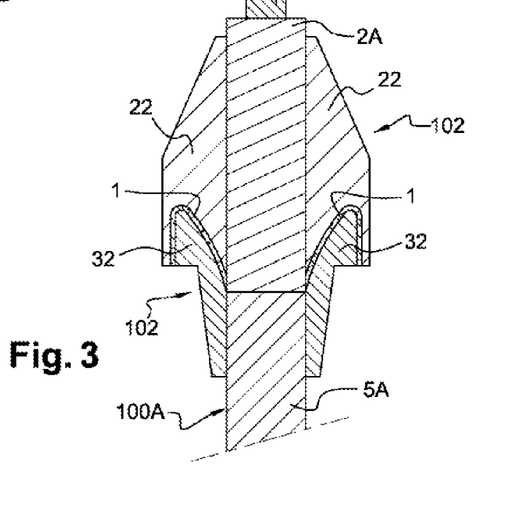
FIG. 3 shows a schematic longitudinal-section view of an electrical cable terminal according to the invention.

The medium- or high-voltage electrical cable terminal 102 illustrated in FIG. 3 is an elongate cone-shaped element inside of which the end of an electrical cable 100A is positioned.

Considering that said electrical cable 100A is a medium- or high-voltage electrical cable comprising an elongate central electrical conductor 10A encircled by a three-layer insulation system of the type made up of what is called an internal semiconductive layer (layer not shown) encircled by an electrically insulating layer 2A, the latter being encircled by what is called an external semiconductive layer 5A, the terminal according to the invention comprises:
- a layer 32 of a semiconductive material (i.e. the "third layer") intended to make contact with the external semiconductive layer 5A of the electrical cable;
- a layer 22 of an electrically insulating polymeric material (i.e. the "second layer"), intended to make contact with the electrically insulating layer 2A of the electrical cable; and
- a layer 1 of a polymeric material having an electrical conductivity gradient (i.e. the "first layer"), positioned between the third layer 32 and the second layer 22.

EXAMPLES

A polymeric material having an electrical conductivity gradient according to the invention was produced by applying a temperature gradient to a composite polymer sample obtained by melt blending of a polymeric composition comprising:
- 97.5% by weight of the EVA (with 12% by weight vinyl acetate groups) sold by ExxonMobil under the reference Escorene UL0112, the melting point of the EVA being 96° C.; and
- 2.5% by weight of the conductive multiwalled carbon nanotubes sold by Arkema under the reference Graphistrength C100.

This blend was produced in the following two steps:
- pre-mixing of the conductive carbon nanotubes with the molten polymer matrix (i.e. the EVA) in a Brabender internal mixer, for 15 minutes at a temperature of 110° C.; then
- homogenizing of the composite using a Scamia two roll mill for 20 minutes, the temperature of the rolls being comprised between 120 and 130° C. Once homogenized the polymeric composition was shaped by hot pressing in order to obtain 1 mm-thick sheets, the following process being used:
- 3 minutes at 110° C. without pressure;
- 3 minutes at 110° C. under a pressure of 3 t; and
- quenching in cold water (15° C.) for 2 minutes.

16 mm-diameter disks were then cut from the sheets thus formed and arranged in alternation with 12 µm-thick aluminum disks of the same diameter in a thermally insulating mold. The aluminum disks were present merely to facilitate the measurement of electrical conductivity as a function of distance from the heat source.

The alternated multilayer of disks of polymeric composition (i.e. composite polymer) and disks of aluminum formed a test sample the two ends of which consisted of disks of polymeric composition. The height of the sample was 30 mm.

Next, the sample was placed in an oven having a temperature gradient, which oven consisted of an upper plate and a lower plate. The temperature gradient was established by applying a setpoint of 300° C. (upper plate) to the upper face of the test sample, while keeping the temperature of the lower face of said sample at room temperature (i.e. 25° C.; lower plate). The corresponding temperature profile was measured at five points throughout the heat treatment (see FIG. 4).

The trial continued 90 minutes under a gentle flow of nitrogen gas. At the end of the treatment, the sample was cooled for 15 minutes between the two plates, set to 15° C.

After the system had completely cooled, the sample was removed from the mold and tested electrically element by element.

The DC electrical conductivity of the polymeric composition (i.e. disks of polymeric composition) was measured by the four-point probe method using a Keithley 2602 SMU.

Figure 4:
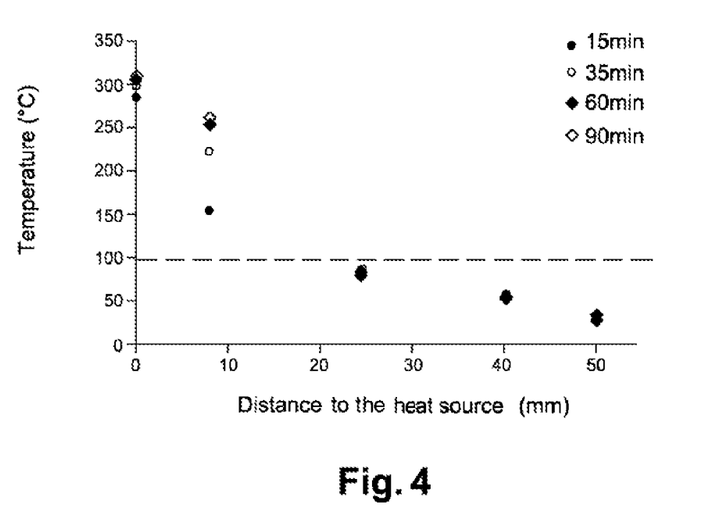
FIG. 4 shows the variation in temperature used to treat a polymeric composition according to the invention.
Figure 5:
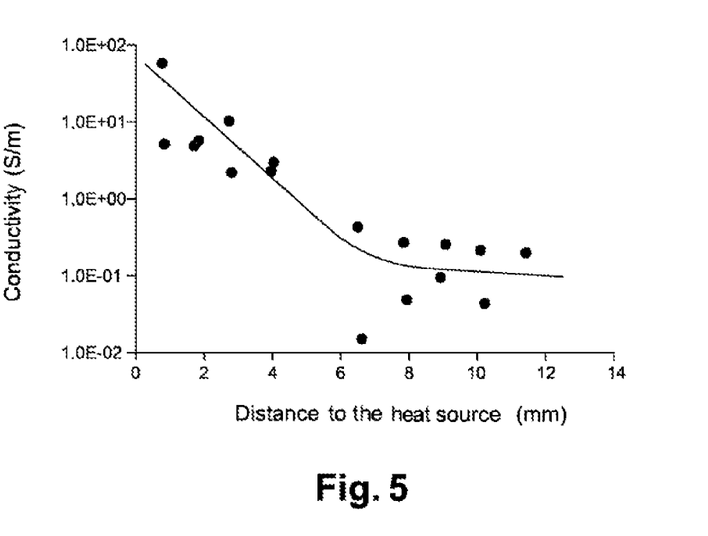
FIG. 5 shows the variation in the electrical conductivity within the polymeric composition treated according to FIG. 4.

FIG. 5 shows the variation in the electrical conductivity of the polymeric composition, as a function of position relative to the heat source during the application of the temperature gradient in FIG. 4. An electrical conductivity gradient is clearly observed in the thickness of the polymeric composition according to the invention.

This is because increasing distance to the heat source—which is equivalent to decreasing the temperature of the heat treatment—has the effect of slowing the dynamics of the microstructural rearrangement (maturing). This leads to a variation in the completeness of the network of conductive carbon nanotubes, which, on the macroscopic scale, results in a lower electrical conductivity.

In the present case, a variation of three orders of magnitude was observed in the electrical conductivity (minimum measured=0.55 S·m$^{-1}$, and maximum measured 4.2×10$^2$ S·m$^{-1}$).

It is important to underline that the amplitude of the electrical conductivity gradient formed in the thickness of the material, just like the maximum and minimum electrical conductivity values of said gradient, may be modulated by controlling the applied temperature profile and the duration of the heat treatment.

The invention claimed is:

1. An electrical element comprising:
an electrically conductive element, wherein the electrical element has a first layer of a polymeric material having an electrical conductivity gradient, which material is obtained from a polymeric composition having at least one polymer and conductive carbon fillers and where said electrical conductivity of said polymeric material gradually varies in the thickness of the first layer.

2. The electrical element as claimed in claim 1, wherein the electrical element has a second layer of an electrically insulating material, said first layer being positioned between the electrically conductive element and the second layer.

3. The electrical element as claimed in claim 2, wherein the electrical conductivity at the surface of the first layer closest the electrically conductive element is higher than the electrical conductivity at the surface of the first layer closest the second layer.

4. The electrical element as claimed in claim 2, wherein said electrical element has a fourth layer of a material identical to that of the first layer, and a fifth layer of a semiconductive material, said fourth layer being positioned between the second layer and the fifth layer.

5. The electrical element as claimed in claim 2, the wherein second layer encircles the electrical conductor.

6. The electrical element as claimed in claim 1, wherein the conductive carbon fillers are selected from the group consisting of carbon blacks, carbon fibers, graphites, graphenes, fullerenes, carbon nanotubes or one of their mixtures.

7. The electrical element as claimed in claim 1, the carbon nanotubes are selected from the group consisting of single-walled carbon nanotubes, double-walled carbon nanotubes, and multi-walled carbon nanotubes, or one of their mixtures.

8. The electrical element as claimed in claim 1, wherein the electrical conductivity of the first layer is comprised between 1×10$^3$ S/m and 1×10$^{-18}$ S/m (limits inclusive).

9. The electrical element as claimed in claim 1, wherein the polymeric composition of the first layer comprises at most 30% by weight conductive carbon fillers.

10. The electrical element as claimed in any one of claims 1 to 9, the electrically conductive element is an electrical conductor.

11. The electrical element as claimed in claim 10, wherein the electrical element is an electrical cable in which the electrically conductive element is the electrical conductor.

12. The electrical element as claimed in claim 1, wherein the electrically conductive element is a third layer of a semiconductive material.

13. The electrical element as claimed in claim 12, wherein the electrical element is an electrical cable in which the electrically conductive element is the third layer.

14. The electrical element as claimed in claim 12, wherein the electrical element is an electrical cable joint in which the electrically conductive element is the third layer.

15. The electrical element as claimed in claim 12, wherein the electrical element is an electrical cable terminal in which the electrically conductive element is the third layer.

16. A process for manufacturing a layer of a polymeric material having an electrical conductivity gradient, for an electrical element such as defined in claim 1, said method comprising the steps of:
a heat treatment of a layer of a polymeric material obtained from a polymeric composition comprising at least one polymer and conductive carbon fillers, said layer having a thickness bounded by a first and a second surface, said treatment step being carried out by applying a first temperature T1 to the first surface and a second temperature T2 to the second surface, so as to form a temperature gradient in the thickness of said layer and to obtain said layer of a material having an electrical conductivity gradient.

17. The process as claimed in claim 16, wherein at least one of the temperatures, T1 or T2, is a temperature equal to or above the melting point Tf or glass transition temperature Tg of said polymer.

18. The manufacturing process as claimed in claim 16, wherein when the electrical element is either one of an electrically conductive element of an electrical cable or a electrically conductive third layer, the electrical conductor of the electrical cable is used as a heat source to apply the temperature gradient.

19. The electrical element as claimed in claim 1, wherein said electrically conductive element is an element different from said first layer.

* * * * *